Sept. 6, 1960 DE FOREST L. TRAUTMAN ET AL 2,951,295

CONTINUOUS-VARIABLE ELECTRONIC TRAFFIC SIMULATOR

Filed March 23, 1956 7 Sheets-Sheet 1

Fig. 1.

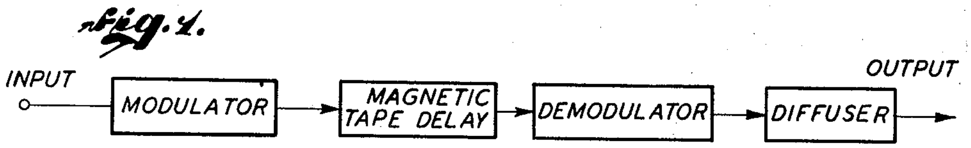

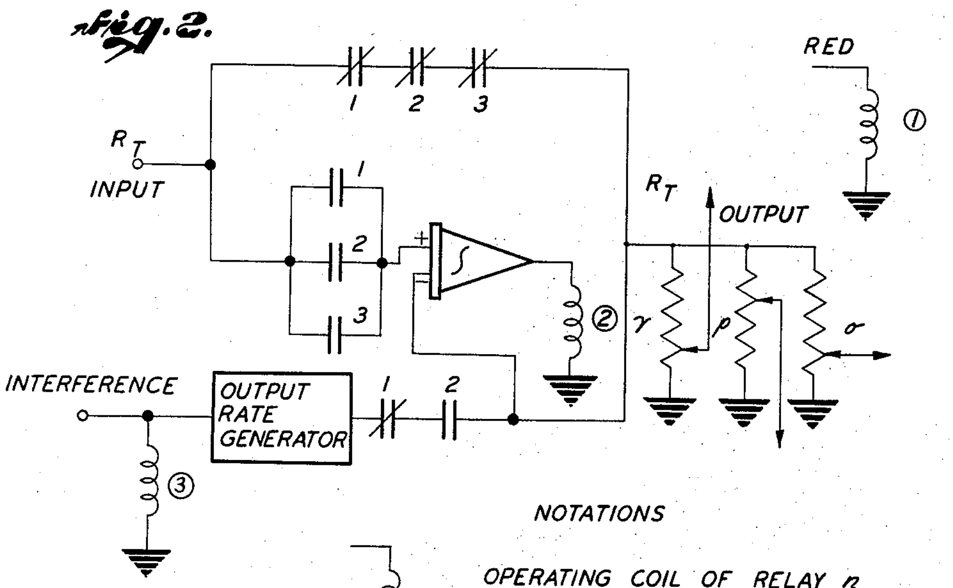

Fig. 2.

NOTATIONS

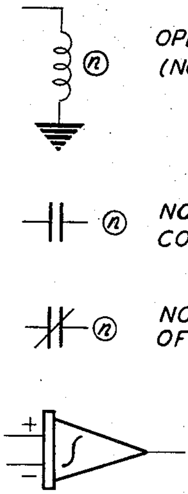

OPERATING COIL OF RELAY n (NORMALLY DE-ENERGIZED)

NORMALLY OPEN SET OF CONTACTS OF RELAY n

NORMALLY CLOSED CONTACTS OF RELAY n

INTEGRATOR: OUTPUT VOLTAGE EQUALS INTEGRAL OF VOLTAGE ON PLUS INPUT MINUS INTEGRAL OF VOLTAGE ON NEGATIVE.

DE FOREST L. TRAUTMAN,
ARNOLD ROSENBLOOM &
JACQUES HEILFRON,
INVENTORS.

HUEBNER, BEEHLER,
WORREL & HERZIG,
ATTORNEYS.

BY Albert M. Herzig

CONTINUOUS-VARIABLE ELECTRONIC TRAFFIC SIMULATOR

Filed March 23, 1956 7 Sheets-Sheet 2

DE FOREST L. TRAUTMAN,
ARNOLD ROSENBLOOM &
JACQUES HEILFRON,
INVENTORS.
HUEBNER, BEEHLER,
WORREL & HERZIG,
ATTORNEYS.
BY Albert M. Herzig

CONTINUOUS-VARIABLE ELECTRONIC TRAFFIC SIMULATOR

Filed March 23, 1956 7 Sheets-Sheet 3

DE FOREST L. TRAUTMAN,
ARNOLD ROSENBLOOM &
JACQUES HEILFRON,
INVENTORS,
HUEBNER, BEEHLER,
WORREL & HERZIG,
ATTORNEYS

BY Albert M. Herzig

CONTINUOUS-VARIABLE ELECTRONIC TRAFFIC SIMULATOR

Filed March 23, 1956 7 Sheets-Sheet 4

DE FOREST L. TRAUTMAN,
ARNOLD ROSENBLOOM &
JACQUES HEILFRON,
INVENTORS.
HUEBNER, BEEHLER,
WORREL & HERZIG,
ATTORNEY
BY Albert M. Herzig DE FOREST L. TRAUTMAN,
ARNOLD ROSENBLOOM &
JACQUES HEILFRON,
INVENTORS.
HUEBNER, BEEHLER,
WORREL & HERZIG,
ATTORNEYS.
BY Albert M. Herzig DE FOREST L. TRAUTMAN,
ARNOLD ROSENBLOOM &
JACQUES HEILFRON,
INVENTORS.
HUEBNER, BEEHLER,
WORREL & HERZIG,
ATTORNEYS.
BY Albert M. Herzig DE FOREST L. TRAUTMAN,
ARNOLD ROSENBLOOM &
JACQUES HEILFRON,
INVENTORS.
HUEBNER, BEEHLER,
WORREL & HERZIG,
ATTORNEYS.
BY
Albert M. Herzig 2,951,295

CONTINUOUS-VARIABLE ELECTRONIC TRAFFIC SIMULATOR

De Forest L. Trautman, Los Angeles, Arnold Rosenbloom, Reseda, and Jacques Heilfron, Los Angeles, Calif., assignors to The Regents of the University of California, Berkeley, Calif., a corporation Filed Mar. 23, 1956, Ser. No. 573,512

6 Claims. (Cl. 35—10.2)

This invention relates to an electronic device for the simulation of traffic conditions at street intersections produced by vehicles and pedestrians, and in particular to a special-purpose electronic device suitable for the study of traffic-flow problems in terms of continuous traffic rate rather than by discrete pulses.

By a continuous variable is meant a variable which takes on a continuum of possible values as distinguished from a discrete variable which takes on at most a countable number of distinct values.

A satisfactory traffic simulator should be capable of operation on a greatly reduced time scale regardless of the complexity of the traffic problem and should comprise various components which can be interconnected to give a representation of a traffic system of arbitrary complexity. Equipment-wise, the simulator preferably should be composed of standard electrical components and should, for the sake of simplicity and reasonable cost, not require an excessive amount of equipment. The simulator should be flexible for the purpose of studying such practical problems as the effects of the length of the street section, legal speed limit, distribution of the actual vehicle speeds about this limit, etc.

Accordingly, it is an important object of the invention to provide a traffic simulator capable of operation on a greatly reduced time scale in connection with the simulation and study of extremely complex traffic problems.

A further object is to provide a traffic simulator made up of various components designed to be interconnected to simulate traffic conditions brought about by various complicating factors found in an actual traffic system.

Another object is to provide a traffic simulator having a high degree of flexibility for studying the effect on traffic flow of a wide variety of factors in terms of lumped effects rather than as discrete pulses.

Additional objects will become apparent from the following description of a specific embodiment of the invention, which is given below with reference to the drawings, wherein:

Figure 1 is a functional diagram of a street component;

Figure 2 is a circuit diagram representing a street intersection;

Figure 11 is a circuit diagram of a traffic simulator for a simple intersection having one-lane approaches.

Figures 13(*b*) is a circuit diagram showing another controlling circuit; and

Figure 13(*c*) is a circuit diagram of still another controlling circuit for a portion of a traffic simulator.

Figure 3:
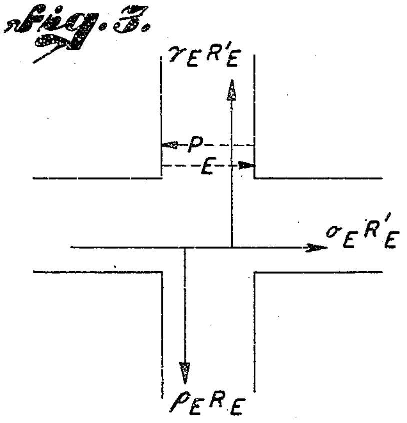
Figure 3 is a diagram showing a street intersection accommodating both vehicular and pedestrian traffic.

The simulator is composed largely of relays and standard, analogue-computer operational amplifiers which operate on continuous voltages representing the flow of traffic in various portions of the network. The design considerations to be described formed the basis of a demonstration set-up, and sample data derived from it are included later in the specification.

There are two major types of components in the simulator, one representing a length of street connecting adjacent intersections and the other representing an intersection. In addition, there is appropriate input-output, and metering equipment. The various components may be connected together to depict any desired street configuration.

The street components take into account such parameters as (1) length of the street section, (2) legal speed limit, and (3) distribution of the actual vehicle speeds about this limit.

The intersection components are of several types, depending on the number of lanes per intersecting street, the number of intersecting streets, and the type of traffic signal present. The parameters accounted for are:

(1) Length and split of traffic signal cycle,
(2) Percentage of vehicles turning right and left,
(3) Amount and nature of pedestrian interference, and
(4) Interference due to opposing traffic flow.

A detailed description of these components follows.

The input to the street component is a voltage representing the instantaneous rate of entry of vehicles, as a function of time, leaving the previous intersection. This rate, measured in vehicles per second, is a short time average of the number of vehicles passing a given point. This voltage is used to amplitude-modulate an audio frequency carrier, which is then recorded on a magnetic tape. The voltage is read off the tape at a later time equal to the length of the street divided by the maximum speed of the vehicles (converted to simulator time). The read off voltage is then applied to a de-modulator, the output of which is a delayed version of the input to the street. Modulation is used in order to avoid the undesirable low-frequency characteristics of magnetic tape.

The output of the demodulator is connected to the input of an electric filter, called the diffusor. Its purpose is to simulate the variation in vehicle speed about the value used in determining the tape delay.

Figure 1 is the functional diagram of the street component.

The design of the diffusing filter is as follows: Let $p(v)\Delta v$ be the fraction of vehicles traveling between velocities $v$ and $v+\Delta v$. Then if the street is $l$ units long, the fraction of vehicles traversing the street in the time between $t$ and $t+\Delta t$ is $$p\left(\frac{l}{t}\right)\frac{l}{t^2}\Delta t$$

since $$v=\frac{l}{t} \text{ and } \Delta v=\frac{l}{t^2}\Delta t$$

Therefore, the output voltage of the street component in terms of the input voltage is given by (starting everything at $t=0$):

$$r(t)=\int_0^t R(r)\,P\left(\frac{l}{t-r}\right)\frac{l}{(t-r)^2}dr \tag{1}$$

If there is a maximum velocity, $v_{\max}$, on the street then $$p(v)=0 \text{ for } v>v_{\max} \text{ or } p(l/t)=0,\ tt\leq_{\min}=\frac{l}{v_{\max}}$$

Thus (1) becomes $$r(t)=\int_0^{t-t_{\min}} R(r)\,P\left(\frac{l}{t-r}\right)\frac{l}{(t-r)^2}dr \tag{2}$$

If we let $\eta=r+t_{\min}$, we obtain $$r(t)=\int_{t_{\min}}^t R(\eta-t_{\min})\,P\left(\frac{l}{t-\eta+t_{\min}}\right)\frac{l}{(t-\eta+t_{\min})^2}d\eta \tag{3}$$

In the above equations "$p$" is a mathematical function. "$v$" is the velocity of an automobile measured, for example, in feet per second. "$t$" is the time under consideration in terms of seconds measured from arbitrary reference time. "$\eta$" represents simply an arbitrary change in variable. Its dimensions are the same as "$r$," namely, time measured in seconds. "$k$" is a function of time representing the impulse response to the diffusor.

Equation 3 states that the output corresponds to the input, delayed by an amount $t_{\min}$, passed through a constant parameter filter whose impulse response is $$k(t)=\frac{l}{(t+t_{\min})^2}P\left(\frac{l}{t+t_{\min}}\right) \tag{4}$$

This, then, is the impulse response of the diffusor, since the $t_{\min}$ delay is the setting of the magnetic-tape delay unit, which consists of the modulator, magnetic tape delay, and demodulator illustrated in Figure 1. An actual circuit for the diffusor is obtainable by means of standard network synthesis techniques, once the variation of velocity is given. Such a filter or diffusor may be constructed in accordance with the principles taught by way of example in Control Systems Synthesis, Truxal, McGraw-Hill, pages 161–220, 379–390.

As stated above, there are various sub-classifications of intersections, but they are all built around a circuit similar to Figure 2.

The voltage appearing on the input terminal represents the rate of vehicles approaching the intersection, in terms of number of vehicles per second passing a given point of the approach to the intersection. There are three conditions to be distinguished: (1) that the intersection is free and the vehicles may proceed through as they arrive; (2) that the intersection is congested and they may proceed only at some rate depending upon the amount of congestion and (3) that they must stop, e.g., on red if the intersection has traffic signals (otherwise omit condition (3)).

In Figure 2, relay No. 1 operates during a red signal, relay No. 2 operates when there are cars waiting at the intersection and relay No. 3 operates when there is congestion due to the other direction of travel (and pedestrians) at the intersection. Thus, if the signal is green, no vehicles waiting and no congestion, there is a direct connection between the input and output and also no voltage on either input to the integrator. This connection leads from the input terminal marked $R_T$ through the series connected normally closed contacts numbered 1, 2, 3 and thence to the Output bus, whence it is distributed in predetermined arbitrarily selected ratios representing vehicles going straight through, vehicles turning right, and vehicles turning left. The integrator is so designed that the output never goes negative. Thus, when there is no input stored in the integrator, an input to the negative terminal is simply ignored. Integrators such as are used throughout this invention may be constructed in accordance with the principles taught in Electronic Analogue Computers, by G. A. Korn and T. M. Korn, McGraw-Hill, 1952, Second Edition, pages 19, 20, 175–179. The integrator is a circuit which stores the time integral of the voltage applied to its positive terminal, while continually subtracting from storage the time integral of the voltage applied to its negative terminal. As noted above, it is so designed that signals appearing on the negative terminal, when there is no positive signal stored in the integrator, are completely ignored. This is the situation for condition (1). If there is congestion due to other directions and/or there are cars waiting, then the input is fed into the integrator and subtracted out of "storage" at the prevailing rate as governed by the congestion. This is condition (2). If the signal is red, then the input is fed into "storage " (the integrator) and no cars are allowed to leave until the green appears.

Figure 5:
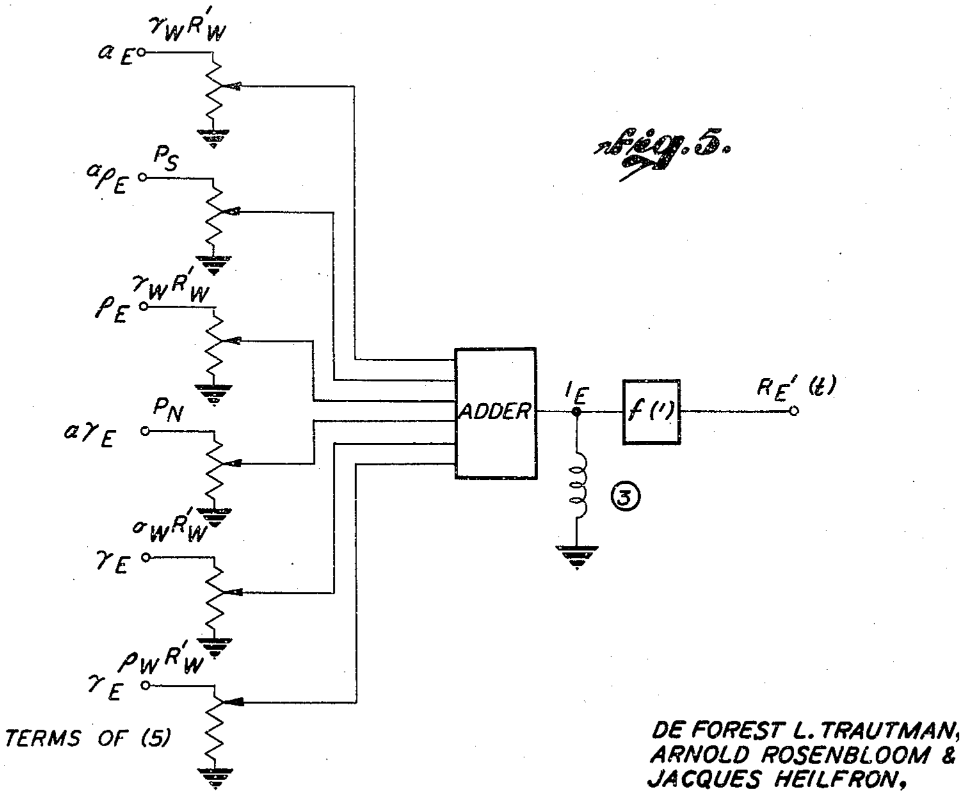
Figure 5 is a circuit diagram showing the form of an output rate generator for representing an intersection discharge rate.

We shall here consider the form and mode of operation of the output rate generator, which is shown in block form in Figure 2, and in greater detail in Figure 5. The function of this device is to set the outgoing vehicle rate when there are vehicles waiting at the intersection or when there is congestion. Under such conditions, the output rate is independent of the input rate and of the number of vehicles waiting at the intersection, but it does depend on the fraction of vehicles from that lane which will perform right and left turns, and on the opposing traffic density. The latter is true because, in a single lane, the vehicles going straight ahead cannot proceed any faster than the vehicles executing right and left turns and vice versa. Therefore, the interference to the vehicles turning right and left, and going straight, establishes one output rate for the entire lane. More specifically, let $P_i$=density of pedestrians crossing at the $i$ side of the intersection, and $R'_i$=rate of vehicles entering the intersetcion proper (after queuing), going in the $i$ direction. The situation represented is that shown in Figure 3, where $\sigma_E$, $\rho_E$, $\gamma_E$ are the fractions of vehicles going straight ahead, turning right and turning left respectively, and originally going east.

Whe shall now define an interference or congestion variable for a given direction:

$$I_E=\sigma_E\gamma_W R'_W+\rho_E(aP_S+\gamma_W R'_W) +\gamma_E(aP_N+[\sigma_W+\rho_W]R'_W \tag{5}$$

where "$a$" is the vehicle equivalent of pedestrian interference. The form of this quantity may be justified by inspection of the individual terms. For example, interference to vehicles going east and then turning left is caused by pedestrians crossing at the north side of the intersection, by vehicles going west straight through the intersection, and by vehicles going west and then turning right. This term is then weighted by the fraction of vehicles making left turns from the lane in question. This weight is necessary because, if there were no vehicles making left turns, the potential interference of the opposing stream and of the pedestrians would not be reflected into the output density of the lane in question.

Figure 4:
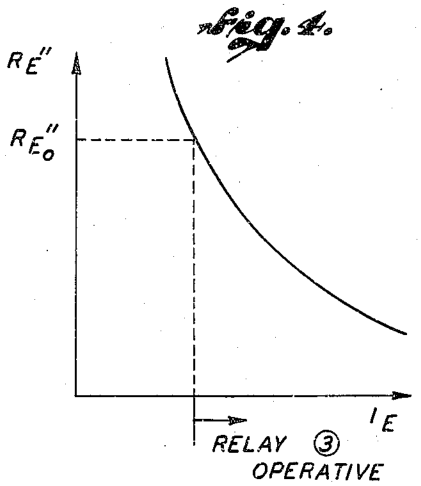
Figure 4 is a graphical representation of traffic interference in a given direction at an intersection of the type shown in Figure 3.

When the interference drops below a certain level, relay No. 3 will be de-energized, as shown in Figure 4. The output rate is set at a value in approximate inverse proportion to the interference. The rate generator will thus have the physical form shown in Figure 5. In this figure the various inputs represent the arbitrarily set interference components identified in Equation 5 above. These components are added in the Adder and then supplied to the coil of relay No. 3, as shown in Figure 5.

The foregoing completes the description of a single lane at an intersection. The various outputs taken from the Output bus of each intersection are then combined, as shown for example in Figure 6, and then applied to a street component, as shown in Figure 1. The output of the street component is then applied to the input of the next intersection.

Figure 6:
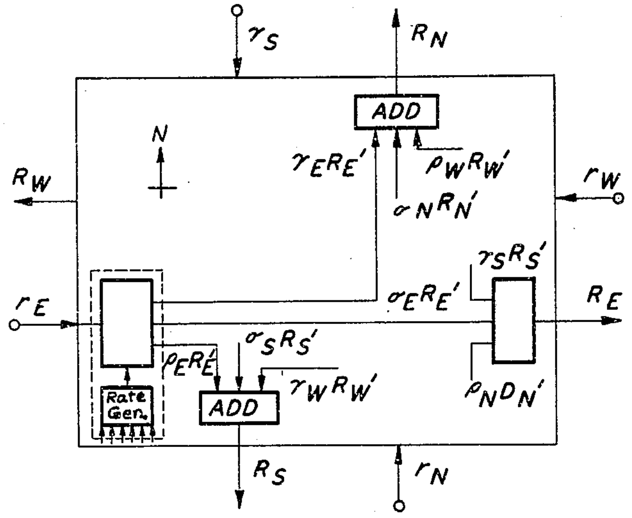
Figure 6 is a diagram showing an interconnection of street components of a single-lane intersection.
Figure 7:
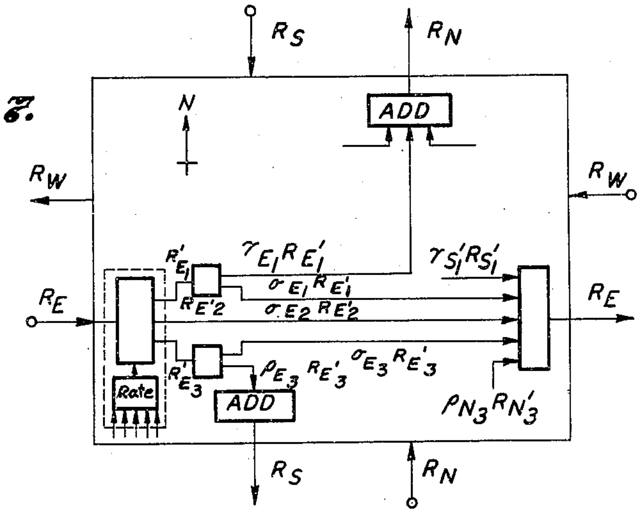
Figure 7 is a diagram similar to that of Figure 6 for a three-lane intersection.

For multilane streets, only slight modification of the simulator is necessary. The identity of the lanes will be lost in the street component, as the output of all lanes in a given direction will be added before entering the delay circuit. This would correspond to the lane changes made by vehicles in the street. At the output of the street the rates (densities) are reapportioned to the various inputs of the following intersection in some fixed proportion. This may be readily achieved by dividing the output of the street component through a series of potentiometers in the manner illustrated for the intersection output in Figure 2. The intersection component of Figure 2 will then be duplicated for each lane. However, the inputs to the individual output rate generators will be different depending on the lane, e.g., no left turns are permitted from the right lane. An alternative, less detailed model is also possible for multilane streets. In this model, the identity of the lanes would not be retained at the intersection either, so that the model would be formally identical to the model for single lane streets. It seems that the best manner of deciding which of these two schemes to use would be an experimental one. Both model should be tested under similar traffic conditions, and if there were no significant difference in the output variables of interest, then the extra complication of the more detailed model would not be justified. Figures 6 and 7 show component interconnections for each model. In Figure 6, for example, in the lower left-hand corner, there is illustrated in block form a device similar to Figure 2, which controls and determines the disposition of traffic entering the intersection from the west and heading east. Similar units are employed to simulate traffic entering the intersection from the north, west and south. Each of these four inputs is disposed of in the manner illustrated in Figure 2 and the three proportionate outputs are applied to north, east and south and added to the corresponding outputs of the other three units. The combined output is then applied to the output terminal. Thus, coming out of the complete intersection illustrated in Figure 6 is a single voltage or quantity representing the aggregate of all of the northbound traffic emanating or freed from the intersection, all the eastbound traffic, all the southbound traffic and all the westbound traffic.

Figure 8:
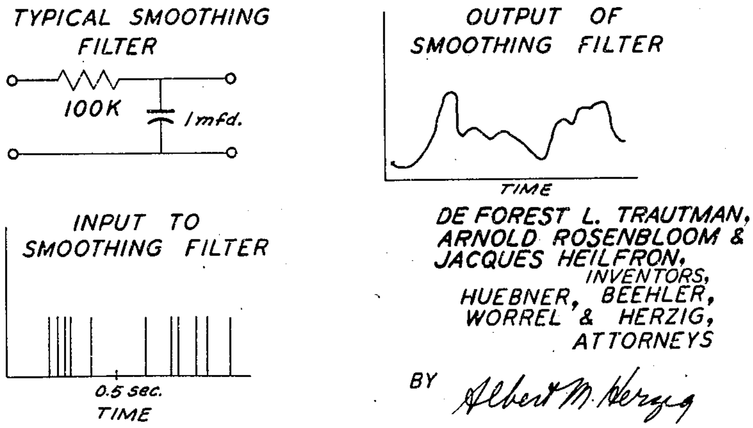
Figure 8 is a diagram showing a typical smoothing filter and graphical representations of the input and output thereof.

At various locations in the simulator will be sources of voltages representing vehicles, corresponding to parking lots, external arteries, etc. It now behooves us to describe the manner in which the continuous traffic rate used in the simulator might be obtained from actual traffic data or from appropriate statistical data. These data will be of a discrete form, i.e., a vehicle might be represented by a punch on a tape. From this tape would be generated a train of electrical pulses by some suitable device, each pulse corresponding to a vehicle. This train of pulses would be applied to a smoothing filter or averaging device such as a low-pass filter as shown in Figure 8.

A suitable choice must be made for the time constant or averaging time of the filter. It would probably be of the order of 10 seconds real time.

Figure 12:
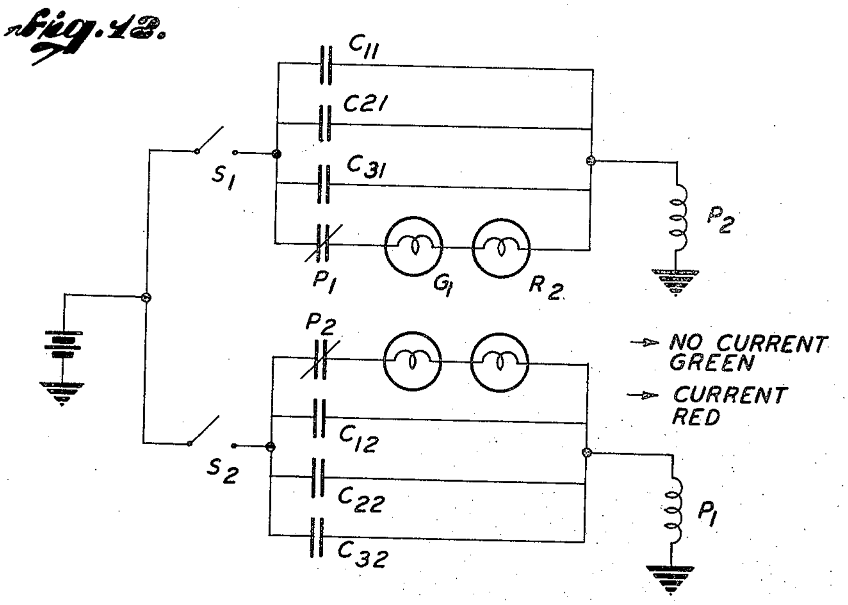
Figure 12 is a circuit diagram showing the switching part of a traffic signal controller.
Figure 14:
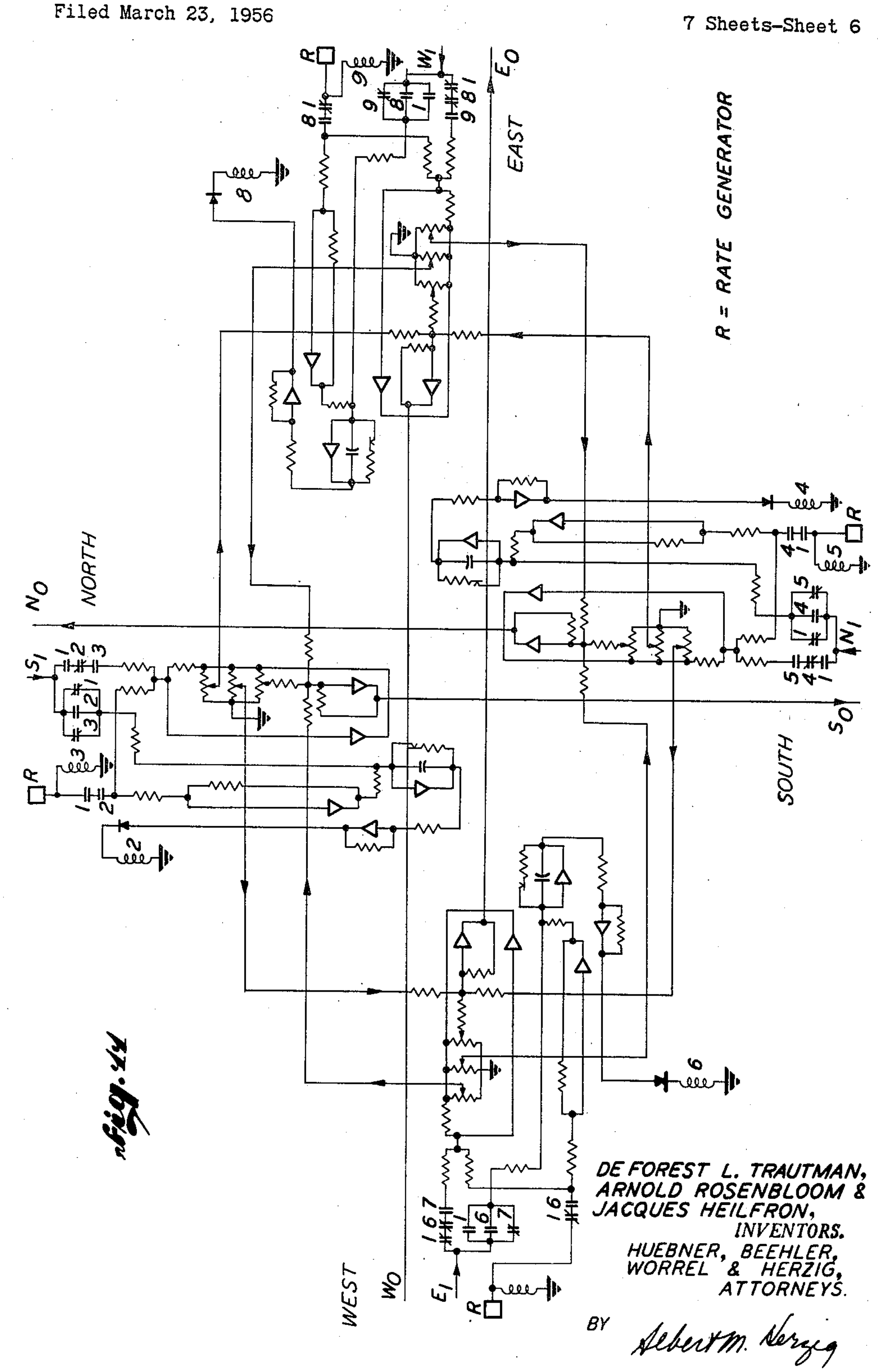

Other equipment necessary to the overall operation of the simulator includes the traffic signal controller as shown in Figure 12. The relays which control the traffic signals as shown in Figure 12, in turn, control the relay No. 1 in Figure 2. There may be also employed suitable metering devices pertinent to the figures of merit being employed in problem solution, such as mean waiting time, steady-state capacity of the system, or the time required for a certain number of vehicles to proceed through a given area. Such metering equipment is described in the co-pending application of Jacques Heilfron, Serial No. 573,513, entitled Discrete-Variable Electronic Traffic Simulator, and assigned to the same assignee as this present application.

The upper limit to the speed of operation of the computer is dictated in part by the operating time of the relays. For example, if the relays operate in 10 milliseconds, and we wish to have this time a small fraction, say 2%, of the traffic signal period, then the signal period on the computer would occupy 500 milliseconds of computer time. If the actual traffic signal takes 25 seconds, then the time base change is 50:1. However, mechanical limitations of the magnetic tape delay may reduce this ratio. The transit time of the magnetic tape from the input head to the output head corresponds to the transit time of a vehicle between two intersections. For example, if the tape is running at 15 in./sec. and the heads are spaced at 5 inches, the street delay is ⅓ sec. computer time. If a vehicle is traveling 20 m.p.h. between intersections spaced at ⅕ mile, the real-time delay is 36 seconds giving a ratio of about 100:1. Thus, it appears that a ratio of about 50:1 would be attainable.

Figure 9:
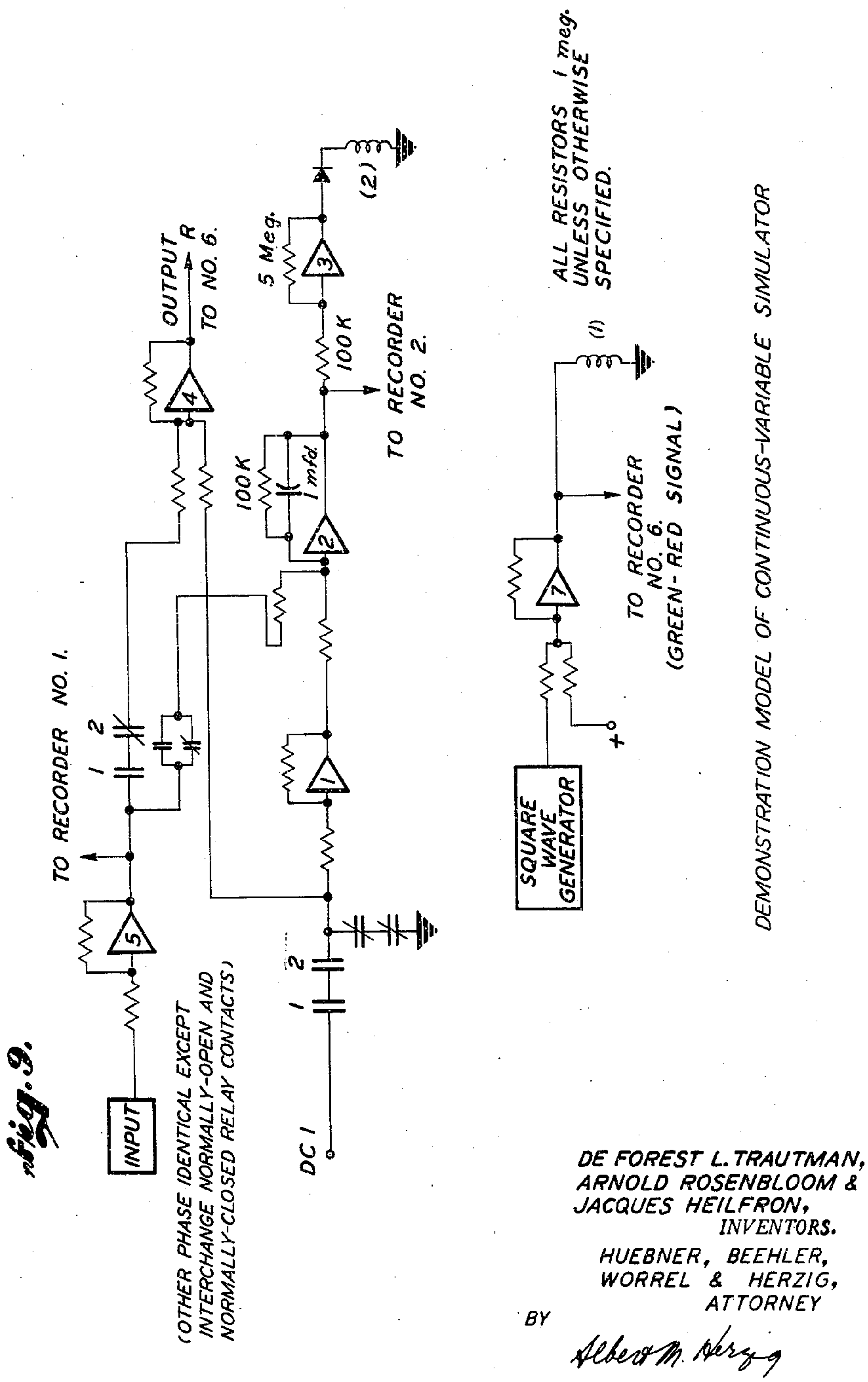
Figure 9 is a circuit diagram of a simplified version of an intersection traffic simulator.
Figure 10:
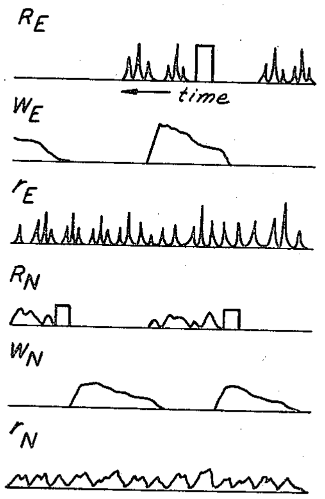
Figure 10 is a set of sample graphs recording data taken with the simulator of Figure 9.

A simplified version, Figure 9, of an intersection was assembled for demonstration purposes from relays and electronic analog simulating equipment operational amplifiers. One lane of traffic for each phase or direction, i.e., north, south, east or west was simulated. There was no output rate generator, the output rate either being constant, when the output of the integrator was positive (vehicles waiting at the intersections), or the same as the input rate (no vehicles waiting) when the signal was green. The incoming traffic rate was generated in the box marked Input by taking the sum of the outputs of two asynchronous neon-bulb relaxation oscillators. This produced a random output typical of traffic flow approaching an intersection. The input and output rates, and the numbers of vehicles waiting were plotted as a function of time, for each phase, on a six-channel recorder, together with a voltage representing the green-red signal. A sample of this record is shown in Figure 10.

The simulator has been designed to use electronic, analogue-computer operational amplifiers and integrators since these components are standard and readily available. However, it could be designed using current instead of voltage to represent traffic rate, and pentodes for current generators, thus replacing the voltage amplifiers.

On the basis of experience with the demonstration setup, further engineering development of an actual simulator, as portrayed above was pursued. Laboratory studies were undertaken on the street delay simulation and on the rate generator. Actual circuits resulted. An over-all unit was developed to employ the full 30 operational amplifiers of the computer. These accommodate a complete intersection and with the tape-street delay unit permit re-cycling traffic through this intersection to simulate problems of larger scope. Figure 11 shows a traffic simulator for a simple intersection having one-lane approaches. In this figure the conventional amplifier triangle when shunted by a resistor represents a typical operational amplifier; when shunted by a variable resistor and capacitor, it represents an integrator of the type disclosed in and discussed in connection with Figure 2. It will be seen in Figure 11 that four intersection input circuits of the type shown in Figure 2 are depicted in Figure 11 and their outputs appropriately handled in the manner shown in Figures 6 and 7.

A traffic signal controller with volume-density vehicle-actuated features may be built on an analog basis for use in connection with the continuous-variable (analog) simulator. The basic building elements are familiar electron tube circuits and relays. An actual traffic signal controller is described in an article by D. L. Gerlough, entitled "Operation of the Volume-Density Vehicle-Actuated Traffic Signal Controller" appearing in Traffic Engineering, volume 23, Number 10, July 1953, at pages 339–344. Simulation of such a traffic signal controller in accordance with the principles of the instant invention will be now described.

In designing the continuous-variable controller, the amber period of a traffic signal cycle will be lumped with green. The switching part of the controller is shown in Figure 12. The operational principle of the circuit in Figure 12 is as follows: $C_{ij}$ ($i$=1, 2, and 3; $j$=1 and 2) are normally-open relays to be actuated by the controlling voltages.

$C_{11}$ and $C_{12}$—Controlled by analogue voltages simulating and representing the number of cars waiting against red on phases 1 and 2 respectively.

$C_{21}$ and $C_{22}$—Controlled by analogue voltages simulating and representing the equivalent rate of traffic flow on green on phases 1 and 2 respectively.

$C_{31}$ and $C_{32}$—Controlled by analogue voltages simulating and representative of the time of first car waiting against red on phases 1 and 2 respectively.

$P_1$ and $P_2$ are relays to be operated by the similarly designated coils in the traffic signal circuits. To start red-green oscillation, one closes the switches $S_1$ and $S_2$ in an arbitrary sequence. Assuming $S_2$ is closed first, current will flow in the coil of relay $P_1$ and thus cause the contacts of relay $P_1$ to open (this corresponds to red on phase 1 and green on phase 2). Now one closes $S_1$, but the signal conditions remain unchanged. During this equilibrium condition, if one of the three relays $C_{11}$, $C_{21}$, or $C_{31}$ is operated by its controlling voltage and suddenly closed, current will flow in coil $P_2$ and cause relay $P_2$ to open. This in turn cuts off the current in coil $P_1$ and causes relay $P_1$ to close. The result of this switching action is an interchange of red-green on the two traffic phases. During the first half of the signal cycle $C_{12}$, $C_{22}$, and $C_{32}$ are not in operation. The term phase indicates a given direction of flow of simulated traffic.

Figure 13A:
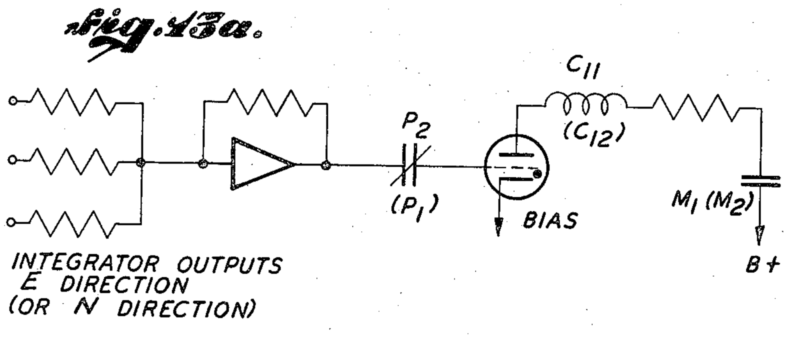
Figure 13(*a*) is a circuit diagram showing a controlled rectifier circuit for part of a simulator.
Figure 13B:
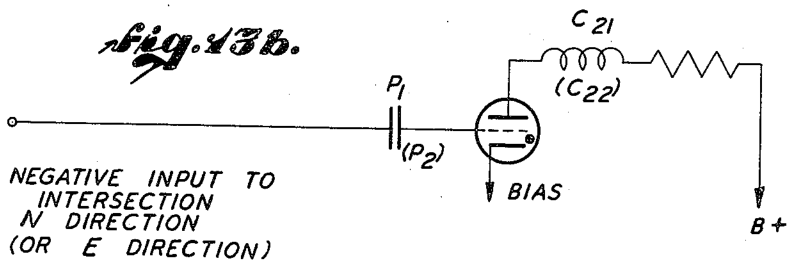
Figure 13C:
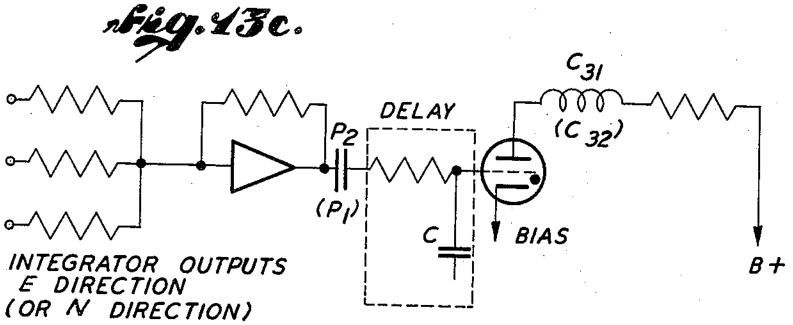

In the second half of the cycle, $C_{11}$, $C_{21}$ and $C_{31}$ do not remain in operation and the switching action is due to the relays $C_{12}$, $C_{22}$ and $C_{32}$ operating in the same way as during the first half cycle. When the red-green is switched again, one signal cycle is completed. The nonperiodic signal cycle is controlled by the circuits illustrated in Figures 12, 13*a*, 13*b* and 13*c*. In Figure 13*a*, for example, the circuit is shown which controls the $C_1$ class of relays. In Figure 13*b* is shown the circuit which controls the $C_2$ class of relays. In Figure 13*c* is shown the circuit which controls the $C_3$ class of relays.

The coils of the relays $C_{11}$, $C_{12}$, $C_{21}$, $C_{22}$, $C_{31}$ and $C_{32}$ are to be operated by appropriate electron-tube circuits comprising controlled rectifiers with the controlling voltages taken directly from the analog traffic simulator as shown in Figures 13*a*, 13*b* and 13*c*.

The relays $C_{11}$ and $C_{12}$ which control the number of cars waiting against red may be operated by the controlled rectifier circuit, Figure 13(*a*). In Figure 13(*a*), $M_1$ (or $M_2$) is an additional relay designed to assure the stable operation of signal cycles and to be operated by a coil in a simple controlled rectifier circuit with a reasonable amount of delay.

The instantaneous rate control on the phase of traffic having the green signal is to be operated by $C_{21}$ and $C_{22}$ relays. The controlling circuits of Figure 13(*b*) may be used.

Finally, the control based on the time of first car waiting against red is to be obtained by operating $C_{31}$ and $C_{32}$ relays with the circuit in Figure 13(*c*). The circuits in Figure 13 may be modified to suit particular needs. The variable parameters may also be chosen in the appropriate parts of these circuits for external adjustment purposes.

Having described our invention, what we claim as new and desire to secure by Letters Patent is:

1. In a continuous-variable traffic simulator an electric component representing a length of street between two street intersections comprising a voltage input to the component for representing the instantaneous rate of entry of traffic units from an adjacent intersection, a modulator means connected to the voltage input for amplitude-modulation by the voltage input, a recorder means connected to the modulator means for recording the voltages of the modulator means, a demodulator means connected to the recorder means for application to the demodulator of voltages read off the recorder means, and a diffusor means connected to the demodulator means for receiving the output thereof and for simulating the variation in speed of traffic units.

2. In a continuous-variable traffic simulator an electronic component representing a length of street between two street intersections comprising a voltage input to the component representing the instantaneous rate of entry of vehicles into the length of street as a function of time leaving an adjacent intersection, an audio frequency carrier connected to the voltage input for amplitude-modulation by the voltage input, a magnetic tape recorder connected to the audio frequency carrier for recording the voltages of the carrier, a demodulator connected to the recorder for application to the demodulator of voltages read off the recorder, and an electric filter connected to the demodulator for receiving the output thereof and for simulating the variation in speed of the vehicles.

3. A method of simulating traffic input to a section of street from an adjacent street intersection comprising the steps of introducing a voltage into an audio frequency carrier to amplitude-modulate the voltage, recording the amplitude-modulated voltage, reading off the recorded voltage at a later time equal to the length of the street divided by the maximum speed of the vehicles in the section of street converted to simulator time, applying the read-off voltage to a demodulator the output of which is a delayed version of the input to the street, diffusing the output of the demodulator to simulate the variations in vehicle speed about the value used in determining the recorder delay.

4. In a continuous-variable traffic simulator an electric component representing a street intersection comprising a voltage input to the component for representing the rate of vehicles approaching the intersection, a number of relay means having their normally closed set of contacts connected in series to the voltage input including a first relay means operable for representing a red signal period, a second relay means operable for representing a period when vehicles are waiting at the intersection, and a third relay means operable for representing a period when there is congestion due to the other direction of travel and pedestrians at the intersection, an output connected in series with the relay means and the input, and an integrator means connected between the input and the output in parallel with the normally closed set of contacts of the relay means and in series with a group of normally open contacts of the relay means connected in parallel with respect to each other.

5. Traffic intersection simulator comprising: an input terminal adapted to receive an analog voltage representing the rate of the approach of vehicles to the intersection, an output terminal, storage means for storing and integrating the voltage applied to said input terminal, circuit means for applying the signal from said input terminal to said storage means, means for applying signal from said input terminal directly to said output terminal and bypassing said storage means, traffic output means for applying to said output terminal an analog voltage representing an interfered traffic output from said intersection, and circuit means for substracting stored signal from said storage means proportional to the output signal from the traffic output means.

6. Traffic simulator comprising first intersection circuit means representing a traffic intersection and having input and output, said input being adapted to receive an analog voltage proportioned to the rate of approach of vehicles to the intersection, said first intersection circuit means including storage means for storing and integrating input signal, means for applying signal to the output of said intersection circuit means representing an interfered output from said intersection and for simultaneously and proportionately removing stored input from said storage means, delay means connected to the output of said intersection circuit means for transmitting and delaying the signal applied thereto, said delay means representing a section of street between two intersections, and second intersection circuit means connected to the output of said delay means to receive the delayed signal from said first intersection circuit means.

References Cited in the file of this patent

UNITED STATES PATENTS

| | | |
|---|---|---|
| 2,525,496 | McCann | Oct. 10, 1950 |
| 2,573,490 | Rheinfrank | Oct. 30, 1951 |
| 2,580,934 | Love et al. | Jan. 1, 1952 |
| 2,695,750 | Kayan | Nov. 30, 1954 |
| 2,712,184 | Ziebolz et al. | July 5, 1955 |
| 2,712,414 | Ziebolz et al. | July 5, 1955 |
| 2,796,218 | Tootill et al. | June 18, 1957 |

OTHER REFERENCES

Larrowe: Direct Simulation, Control Engineering, November 1954, pages 25 to 31.